Oct. 16, 1945.  G. F. YAGER  2,387,105
SPINDLE STRUCTURE
Filed Dec. 21, 1942  2 Sheets-Sheet 1
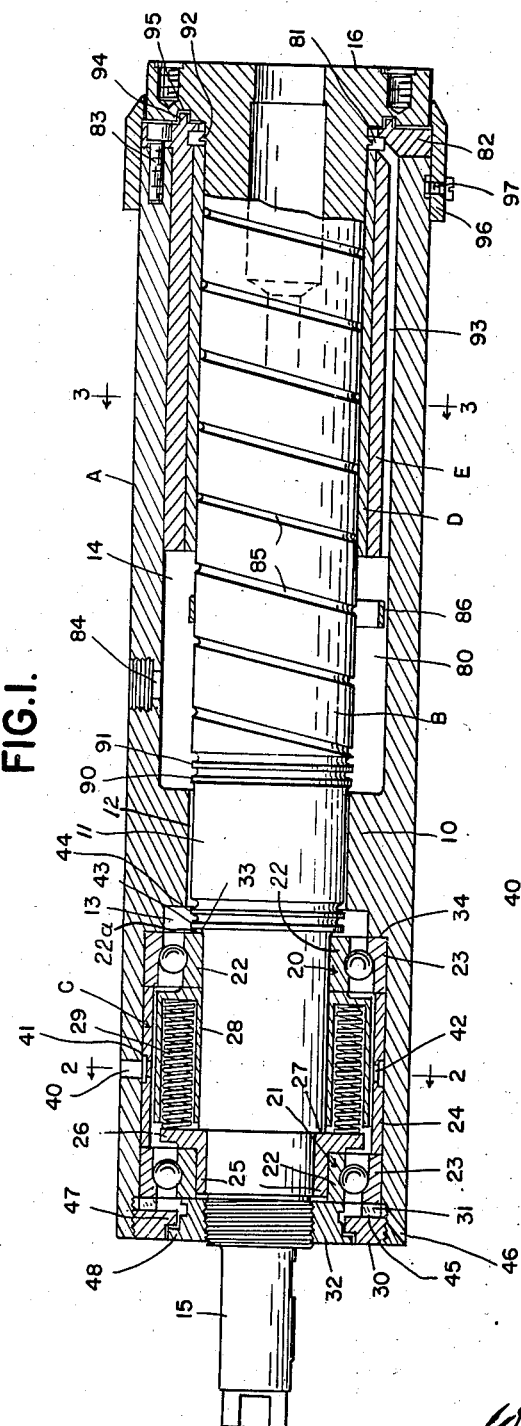
INVENTOR.
GEORGE F. YAGER
BY
*Whittemore Hulbert & Belknap*
ATTORNEYS

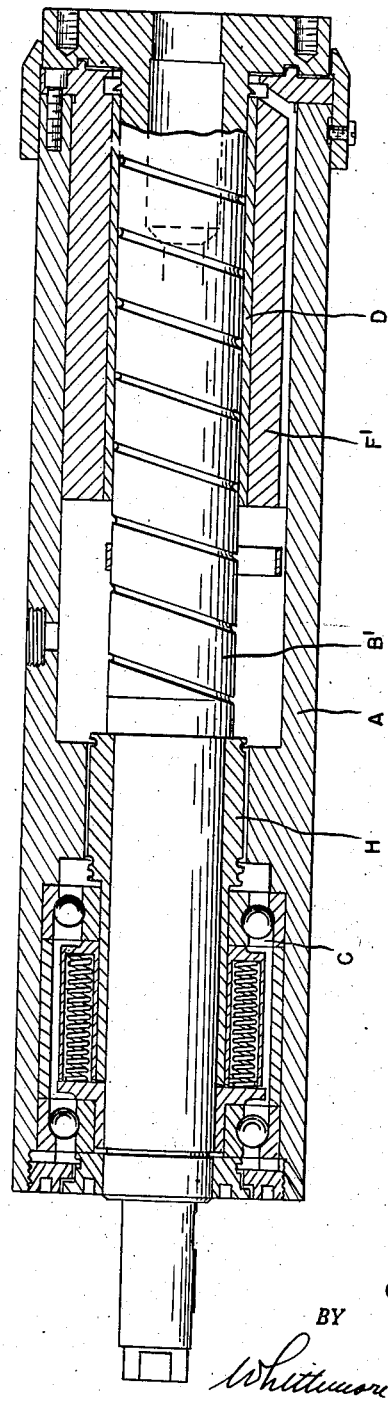

Patented Oct. 16, 1945

2,387,105

UNITED STATES PATENT OFFICE 2,387,105

SPINDLE STRUCTURE

George F. Yager, Toledo, Ohio, assignor to The Bunting Brass & Bronze Company, Toledo, Ohio, a corporation of Ohio Application December 21, 1942, Serial No. 469,716

5 Claims. (Cl. 308—189)

This invention relates generally to spindle assemblies and refers more particularly to an improved spindle assembly adapted for use in boring, turning, facing or grinding machines for carrying and driving the chuck or holder for the work.

One of the essential objects of the invention is to provide a more rigid assembly to avoid chatter when operating at relatively high speeds and to permit a finer and more precise tool operation or finish to be obtained within close limits on the work.

Another object is to provide an assembly wherein the rotatable element or spindle is mounted in such a way that it has an immense load carrying capacity and is capable of operating without deflection.

Another object is to provide an assembly wherein the spindle travels on a film of oil which not only serves as a lubricant to avoid metal to metal contact and reduce wear to a minimum, but also functions as a cleaning and washing agent for grit, dirt and other foreign particles, and as an absorber of shock from the drive belt for the spindle.

Another object is to provide an assembly wherein a given size quill may accommodate various sizes of spindles.

Another object is to provide an assembly wherein a sleeve-type bearing for the spindle has a sleeve-type adaptor that forms therewith a sub-assembly capable of being removed as a unit from the quill when it is desired to refinish or bore the bearing to renew the same. Thus, this arrangement obviates the boring of the bearing while in the quill and permits the renewal of the bearing to be more easily and accurately effected.

Another object is to provide an assembly wherein two different grades of oil or lubricant such as heavy and light oil may be employed without commingling to lubricate different parts of the assembly.

Another object is to provide an assembly wherein the employment within the quill of a plain sleeve-type bearing for the spindle permits the use of larger spindles capable of running longer and handling heavier work.

Another object is to provide an assembly that is simple in construction, economical to manufacture, easy to install and efficient in operation.

Other objects, advantages and novel details of construction of this invention will be made more apparent as this description proceeds, especially when considered in connection with the accompanying drawings, wherein:

Figure 1 is a longitudinal vertical sectional view through a spindle assembly embodying my invention;

Figure 2 is a vertical cross sectional view taken substantially on the line 2—2 of Figure 1;

Figure 3 is a vertical cross sectional view taken substantially on the line 3—3 of Figure 1;

Figure 4 is a view similar to Figure 1 but showing a slight modification.

Referring now to the drawings, A is the quill, B is the spindle, C is a spring loaded ball bearing assembly for the spindle, D is a plain sleeve bearing for the spindle, and E is a flanged adaptor for the sleeve bearing of a spindle assembly embodying my invention.

As shown, the quill A is tubular in form and is provided intermediate its ends, preferably adjacent the inner end of the ball bearing assembly C, with an inwardly projecting annular enlargement 10 which is concentric with but spaced slightly from a cylindrical portion 11 of the spindle B to provide a predetermined clearance 12 therebetween. Actually, this enlargement 10 constitutes a partition element and cooperates with the cylindrical portion 11 of the spindle to divide the interior of the quill A into two longitudinally spaced chambers 13 and 14 respectively for the ball bearing assembly C and the sleeve bearing D and adaptor E.

The spindle B extends axially of the quill A throughout its length and is provided beyond opposite ends thereof with endwise and lateral projections 15 and 16 respectively. The endwise projection 15 is the driving end of the assembly and is adapted to carry a belt or chain driven pulley (not shown) by which the spindle B may be rotated, while the lateral projection or flange 16 is the work carrying end of the assembly and is adapted to carry a work holding chuck (not shown) by which the work or tool may be rotated relative to one or more tools (not shown) to obtain the desired boring, turning, facing or grinding operation.

The spring loaded ball bearing assembly C is within the chamber 13 and comprises two sets 20 and 21 respectively of ball bearings at longitudinally spaced points of the spindle B, inner and outer races 22 and 23 respectively for each set, a collar 24 between the outer races 23 of said sets, a collar 25 within the inner race 22 of the outer set 21 and having a lateral flange 26 abutting a shoulder 27 of the spindle B and extending toward but terminating short of the collar 24, a spring retainer 28 between the lateral flange 26 of the collar 25 and the inner race 22 of the inner set 20, coil springs 29 within said retainer 28 and projecting endwise therefrom against the lateral flange 26 of the collar 25, a clamping nut 30 threadedly engaging the quill A and having a slotted flange 31 abutting the outer race 23 of the set 21, and a clamping nut 32 threadedly engaging the spindle B and abutting the inner race 22 of the set 21.

Preferably the inner race 22 of the inner set 20 is adjacent a flange 33 of the spindle B, while the outer race 23 of the inner set abuts a shoulder 34 of the quill A. Thus there is a slight space 22a between the inner race 22 and the flange 33 so that the inner race can move in response to expansion of the springs 29. The nut 32, inner race 22 of the outer set 21, collar 25, retainer 28 and springs 29 therein, and inner race 22 of the inner set 20 are carried by and rotate in unison with the spindle B relative to the nut 30, outer races 23 of the sets 21 and 20, collar 24 and quill A. Actually, the springs 29 take up thrust wear that otherwise might have a tendency to produce objectionable end play. Such springs 29 also compensate for any pull transmitted to the spindle B from the pulley and its driving belt, especially when the belt load is downward.

In the present instance I prefer to use relatively heavy oil within the chamber 13 containing the ball bearing assembly C. To receive such oil I have provided in the quill A an oil inlet 40 that is in registry with an annular groove or passage 41 in the collar 24. Circumferentially spaced holes 42 are provided in the collar 24 in registry with this groove 41 to permit oil to flow from the groove to the interior of the chamber 13. However, it is desirable to prevent this heavy oil from entering the chamber 14 containing the sleeve bearing D, hence the spindle B is provided at the inner end of the chamber 13 with longitudinally spaced rings 43 and 44 respectively that constitute oil slingers for throwing off the oil so that it will not enter the clearance space 12 between the inward enlargement 10 of the quill and the cylindrical portion 11 of the spindle. Consequently such oil will flow between the inner and outer races 22 and 23 respectively of the inner set 20, between the spring retainer 28 and collar 24, between the inner and outer races 22 and 23 respectively of the outer set 21, and thence through slots 45 in the flange 31 of the nut 30 to one or more drainage or outlet passages 46 in the quill A. In this connection it will be noted that the clamping nuts 30 and 32 have cooperating flanges 47 and 48 that collectively provide a seal to preclude the escape therebetween of oil from the chamber 13 and to exclude dirt, dust, etc. Thus, the only discharge of oil is through the drainage slot 46.

The sleeve bearing D and flanged adaptor E are disposed one within the other as a removable subassembly within the chamber 14 and are preferably spaced from the inward enlargement 10 of the quill A to provide a sump 80 for oil. The bearing D terminates short of the lateral projection 16 of the spindle B so as to provide a space 81 for oil, while the flange 82 of the adaptor projects laterally outward between the lateral projection 16 of the spindle and the adjacent end of the quill A and is fastened to the latter by one or more screws 83.

Preferably the oil used in the chamber 14 is comparatively light or is a mixture of approximately 75% kerosene and 25% spindle oil. Such oil is fed through a suitable inlet opening 84 in the quill A to the sump 80 and is carried by a spiral groove 85 in the spindle B into the sleeve bearing D. A ring 86 of greater diameter than the spindle B is loose on the spindle within the sump 80 and cooperates with the spindle B during rotation thereof to facilitate the transfer of oil from the sump via the spiral groove 85 to the inside of the bearing D.

To prevent the light oil in the chamber 14 from entering the chamber 13 containing the ball bearing assembly C, I have provided longitudinally spaced rings 90 and 91 respectively on the spindle B at the inner end of the chamber 14 for throwing such oil outwardly into the chamber so that it will not enter the clearance space 12 between the inward enlargement 10 of the quill A and the cylindrical portion 11 of the spindle B.

Preferably the spiral groove 85 for oil commences adjacent the ring 91 and terminates approximately one inch from the outer end of the sleeve bearing D. Thus, this termination of the spiral groove 85 short of the outer end of the bearing D causes the pressure of the oil within the bearing D to build up sufficiently to substantially float the spindle B centrally in the bearing D.

Located in the space 81 between the outer end of the bearing D and the lateral projection 16 of the spindle is an oil slinging ring 92 on the spindle B for throwing oil outwardly from said space to prevent it from escaping between the flange 82 of the adaptor E and the lateral projection 16 of the spindle B, while extending lengthwise of the adaptor E from said space 81 to the sump 80 is one or more passages 93 receiving the thrown oil aforesaid and returning it to the sump 80. Moreover, the flange 82 of the adaptor E is provided on its outer face with an annular rib 94 that extends within and cooperates with the walls of an annular recess 95 in the inner face of the lateral projection 16 of the spindle to form a seal to prevent the escape of oil and to exclude dirt, dust, etc. Also an annulus 96 is sleeved upon the quill A to cover the lateral flange 82 and a portion of the projection 16 and joints therebetween as a further shield against dirt, dust, etc. Any suitable means such as a set screw 97 may be employed to hold the annulus 96 in place.

In use, the quill A may be mounted by any suitable means (not shown) upon or within the housing or frame of the machine in which it is to be employed. After the drive pulley (not shown) is keyed upon the axial projection 15 of the spindle, and the work holding chuck (not shown) is bolted to the lateral projection 16 of the spindle, the rotation of the spindle B in the quill A may be effected so that the work may be engaged by the desired tool to obtain the proper boring, turning, facing or grinding operation. While the spindle B is rotating heavy oil may be supplied to the inlet opening 40 for the chamber 13, while light oil may be supplied to the inlet opening 84 for the sump 80 in the chamber 14, and such oils will serve efficiently to lubricate the parts without commingling, due to the action of the oil slinger rings 43, 44, 90 and 91 respectively. Actually, the oil carried by the spiral groove 85 into the sleeve bearing D will enhance the operation of the spindle B in the bearing D. In fact the spindle B rotates on a film of oil within the bearing D. Hence the provision of the relatively long sleeve bearing D and oil passage 85 provides an assembly having an immense load carrying capacity without deflection. Thus, I have provided a more rigid assembly that avoids chatter and permits a finer and more precise tool operation to be obtained in close limits on the work.

In practice the spindle B may be solid or may have a conventional axially extending air passage such as 98 for use with air actuated mechanism (not shown). Inasmuch as the sleeve bearing D and adaptor E are assembled as a unit which may be removed from the quill A, it is possible to more accurately refinish or renew the sleeve bearing D after the unit is removed than would be the case if this had to be done if the bearing D was within the quill A.

In Figure 4 I have illustrated a slight modification wherein a heavier adaptor E' and a sleeve H are employed within the quill A to accommodate a smaller spindle B'. Otherwise the construction and operation are the same as in Figure 1. As will be apparent, the sleeve H is added to increase the cross sectional area of the spindle B' to the inside diameter of the ball bearing assembly C, while the heavier adaptor E' is employed to increase the cross sectional area of the spindle B' and bearing D to the inside diameter of the quill A.

What I claim as my invention is:

1. A spindle assembly having a quill, a rotatable spindle in said quill, a spring loaded ball bearing assembly for said spindle within said quill, clamping nuts carried by the spindle and quill for holding the ball bearing assembly in the quill, and an inlet and an outlet for oil for the ball bearing assembly being provided in the quill, one of said clamping nuts having a slot permitting oil to escape from the ball bearing assembly to the oil outlet in the quill.

2. A spindle assembly having a quill, a rotatable spindle in said quill, and a spring loaded ball bearing assembly for said spindle within said quill, including two longitudinally spaced sets of ball bearing races between the spindle and quill, the inner and outer races of one set being beside abutments of the spindle and quill, a spacer collar between the outer races of both sets, a collar within the inner race of the second set and having a lateral flange between said sets abutting a shoulder of the spindle, a spring retainer between said lateral flange and the inner race of the first set, spring means within said retainer and projecting endwise therefrom against said lateral flange, and means for holding the ball bearing assembly in the quill including clamping nuts carried by the spindle and quill and engaging the second set of races, the quill having an inlet for oil for said ball bearing assembly, and the quill and one of the clamping nuts having registering slots providing an outlet for oil from said quill.

3. A spindle assembly having a quill, a rotatable spindle in said quill, a spring loaded ball bearing assembly for said spindle within said quill and including two longitudinally spaced sets of ball bearing races between the spindle and quill, each set having inner and outer races, the inner and outer races of one set being beside abutments of the spindle and quill, a spacer collar within the quill between the outer races of both sets, an annulus on the spindle within said spacer collar, said annulus abutting the inner race of said one set and spaced from the inner race of the second set, said annulus having circumferentially spaced longitudinally extending sockets opening toward the inner race of the second set, a collar on the spindle abutting a shoulder thereof and having a lateral flange in the space between the annulus and inner race of the second set, coil springs within said sockets and projecting therefrom against said lateral flange, and means for holding the ball bearing assembly against displacement, including clamping nuts carried by the spindle and quill respectively and abutting the inner and outer races respectively of the second set of races, the quill having an inlet for oil for said ball bearing assembly, and the quill and one of said nuts having registering openings providing an outlet for oil from the assembly.

4. A spindle assembly having a quill, a rotatable spindle in said quill, a spring loaded ball bearing assembly for said spindle within said quill and including two longitudinally spaced sets of ball bearing races between the spindle and quill, each set having inner and outer races, the inner and outer races of one set being beside abutments of the spindle and quill, and means for holding the ball bearing assembly against displacement, including clamping nuts carried by the spindle and quill respectively and abutting the inner and outer races respectively of the second set of races, the quill having an oil inlet for said ball bearing assembly, and the quill and one of said nuts having registering openings providing an outlet for oil from the assembly.

5. A spindle assembly having a quill, a rotatable spindle in said quill, a spring loaded ball bearing assembly for said spindle within the quill, said quill having an inlet for oil for said ball bearing assembly, and clamping nuts for the ball bearing assembly carried by the quill and spindle respectively and having flanges cooperating with each other to provide a seal to prevent the escape of oil and to prevent dirt, dust and the like outside the quill from entering the ball bearing assembly, the quill and one of said nuts having registering openings providing an outlet for oil from said assembly.

GEORGE F. YAGER.